US010070032B2

(12) United States Patent
Harada et al.

(10) Patent No.: US 10,070,032 B2
(45) Date of Patent: Sep. 4, 2018

(54) WIRELESS COMMUNICATION ASSISTANT TOOL AND METHOD OF MAKING WIRELESS COMMUNICATION

(71) Applicant: LUMICA CORPORATION, Fukuoka (JP)

(72) Inventors: Shiro Harada, Fukuoka (JP); Shizuki Dogawa, Fukuoka (JP); Koichi Himeno, Fukuoka (JP)

(73) Assignee: LUMICA CORPORATION, Fukuoka (JP)

( * ) Notice: Subject to any disclaimer, the term of this patent is extended or adjusted under 35 U.S.C. 154(b) by 0 days.

(21) Appl. No.: 15/651,247

(22) Filed: Jul. 17, 2017

(65) Prior Publication Data

US 2017/0318210 A1    Nov. 2, 2017

Related U.S. Application Data

(63) Continuation of application No. PCT/JP2016/051734, filed on Jan. 21, 2016.

(30) Foreign Application Priority Data

Jan. 23, 2015  (JP) ................................ 2015-011663
Jul. 21, 2015  (JP) ................................ 2015-144147

(51) Int. Cl.
*H04H 40/00*    (2009.01)
*H04N 5/232*    (2006.01)
(Continued)

(52) U.S. Cl.
CPC ............. *H04N 5/232* (2013.01); *G03B 17/08* (2013.01); *G03B 17/56* (2013.01); *H04B 1/38* (2013.01)

(58) Field of Classification Search
CPC .......... H04N 5/232; H04B 1/38; G03B 17/08; G03B 1/56
See application file for complete search history.

(56) References Cited

U.S. PATENT DOCUMENTS 8,462,069 B2 *  6/2013  Tesh ....................... H01Q 1/273
                                                         343/720
2004/0064219 A1 *  4/2004  Mancosu ............ B60C 23/0411
                                                         73/146
(Continued)

FOREIGN PATENT DOCUMENTS

JP       3026891 U    5/1996
JP     H09-051453 A   2/1997
(Continued)

OTHER PUBLICATIONS

International Search Report issued in PCT/JP2016/051734, dated Mar. 8, 2016, with translation (5 pages).
(Continued)

*Primary Examiner* — Dominic Rego
(74) *Attorney, Agent, or Firm* — Nakanishi IP Associates, LLC

(57) ABSTRACT

A wireless communication assistant tool includes an electric wire disposed at one end thereof relative to an antenna of a first wireless communication device, a camera, in a contactless condition, and at the other end thereof relative to an antenna of a second wireless communication device, a smartphone, in a contactless condition. Disposition of such electric wire permits wireless communication between the camera and the smartphone through the electric wire acting as a transmission path, so that the camera and the smartphone can make communication with each other without being interfered with other radio signals.

15 Claims, 11 Drawing Sheets

(51) Int. Cl.
  *G03B 17/08* (2006.01)
  *G03B 17/56* (2006.01)
  *H04B 1/38* (2015.01)

(56) References Cited

U.S. PATENT DOCUMENTS

| | | | |
|---|---|---|---|
| 2005/0076500 A1* | 4/2005 | Matsumura | H01R 43/28 29/828 |
| 2007/0103649 A1 | 5/2007 | Takada et al. | |
| 2008/0284662 A1* | 11/2008 | Yagi | H01Q 1/243 343/702 |
| 2013/0113679 A1* | 5/2013 | Wang | H01Q 9/32 343/872 |
| 2014/0104116 A1* | 4/2014 | Chiu | H01Q 1/24 343/702 |
| 2015/0070503 A1* | 3/2015 | Kraeling | H04N 5/23203 348/148 |
| 2015/0147066 A1* | 5/2015 | Benjamin | H04B 10/25759 398/116 |
| 2015/0264202 A1* | 9/2015 | Pawlowski | H04N 1/00106 348/207.11 |

FOREIGN PATENT DOCUMENTS

| | | |
|---|---|---|
| JP | H10-303628 A | 11/1998 |
| JP | 2006-145983 A | 6/2006 |
| JP | 2008-048391 A | 2/2008 |
| JP | 2008-312253 A | 12/2008 |
| JP | 2011-146391 A | 7/2011 |
| JP | 2011-166729 A | 8/2011 |
| JP | 2011-221475 A | 11/2011 |
| JP | 2011-244179 A | 12/2011 |
| JP | 2013-101397 A | 5/2013 |

OTHER PUBLICATIONS

Written Opinion of International Searching Authority issued in PCT/JP2016/051734, dated Mar. 8, 2016 (4 pages).

Office Action issued in Japanese Patent Application No. 2015-144147, dated Oct. 13, 2015, with English translation (8 pages).

Office Action issued in Japanese Patent Application No. 2015-144147, dated Jun. 14, 2016, with English translation (8 pages).

* cited by examiner

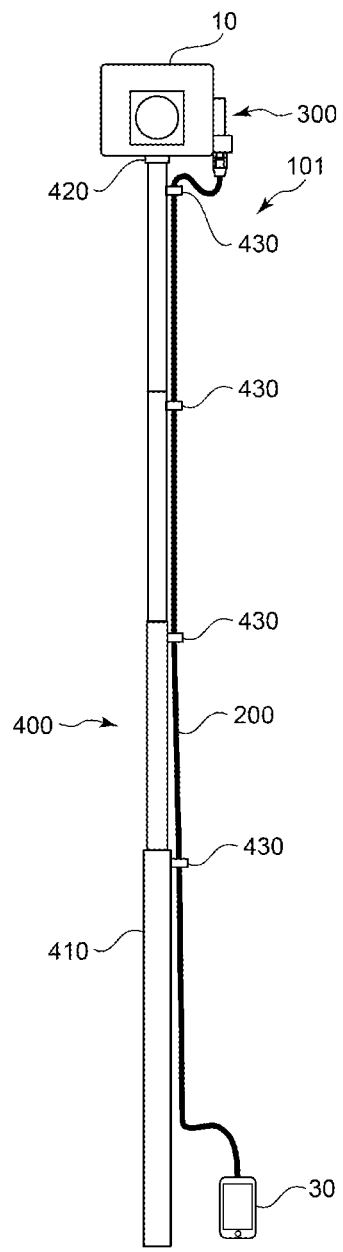

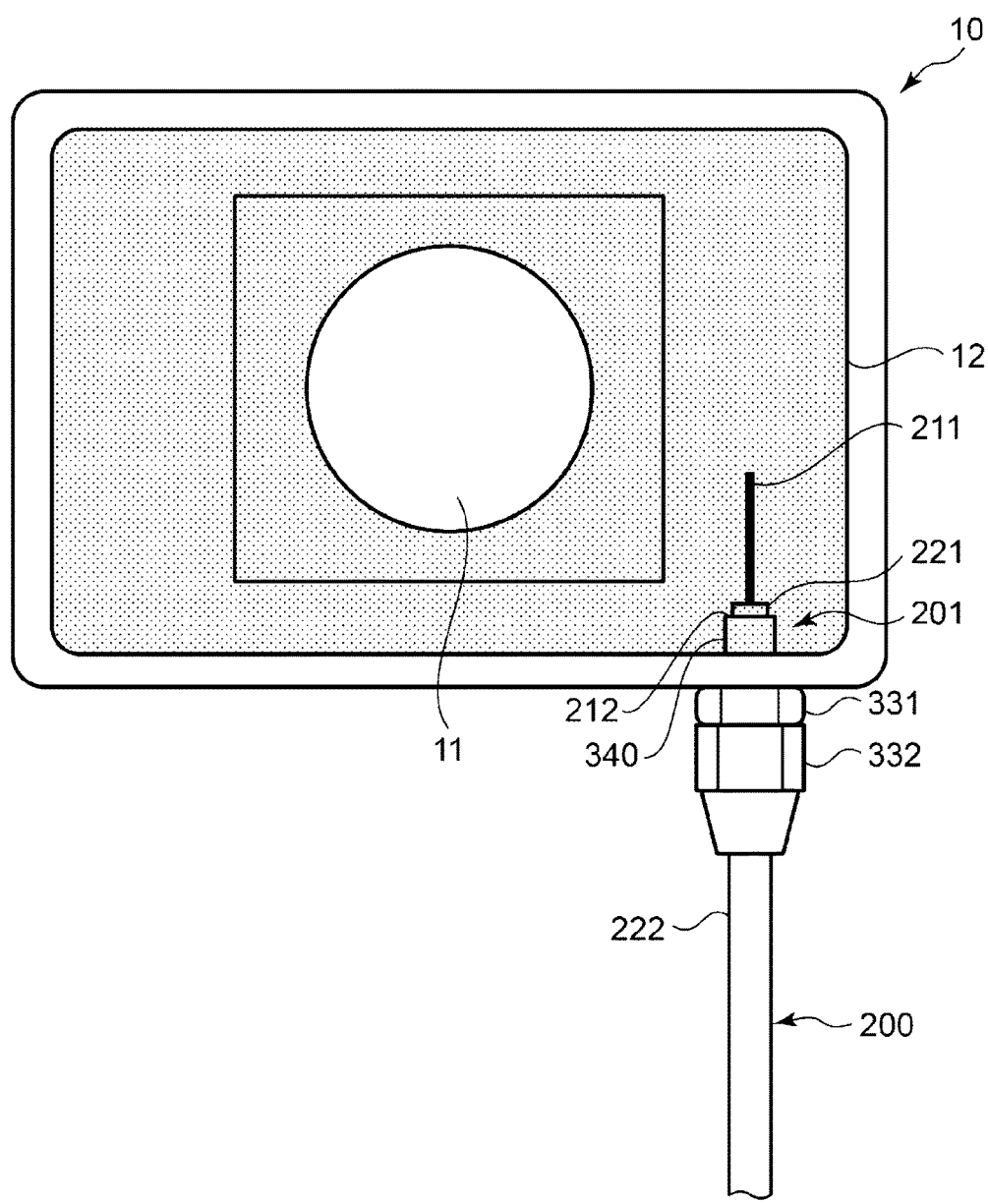

WIRELESS COMMUNICATION ASSISTANT TOOL AND METHOD OF MAKING WIRELESS COMMUNICATION

CROSS-REFERENCE TO RELATED APPLICATIONS

This application is a continuation application of International Patent Application No. PCT/JP2016/051734 filed on Jan. 21, 2016, which claims priority to Japanese Patent Application No. 2015-011663 filed on Jan. 23, 2015 and Japanese Patent Application No. 2015-144147 filed on Jul. 21, 2015, the entire contents of which are incorporated by reference.

FIELD OF THE INVENTION

The present invention relates to a wireless communication assistant tool and a method of making wireless communication, all of which are able to provide improved communication environment.

BACKGROUND ART

In the case that two wireless communication devices are far away from each other, they make communication through radio signals. For instance, an operation device such as a smartphone and a tablet type computer are generally used to operate a printer, a video camera or a still camera through wireless communication such as WiFi (registered trademark) or BLUETOOTH (registered trademark) standards.

For instance, the patent document 1 discloses the combination of a photographing system, an artificial light source, and a camera. A wireless tag mounted on the artificial light source transmits information relating to the artificial light source (for instance, information about a color temperature). The camera is equipped with a wireless tag receiver receives the information from the wireless tag, and determines a white balance value in accordance with the received information.

In this way, wireless communication is made to transmit information from a transmitter to a receiver situated far from the transmitter.

PRIOR ART DOCUMENTS

Patent Documents

Patent document 1: Japanese Patent Application Publication No. 2008-312253
Patent document 2: Japanese Patent Application Publication No. H9 (1997)-51453
Patent document 3: Japanese Patent Application Publication No. 2006-145983

A printer and a video camera as well as a smartphone, a table and a notebook type personal computer are designed to have a function of making wireless communication, and thus, a smartphone, a tablet and so on are able to transmit a print order directly to a printer, or operate a video camera.

However, when devices having various communication functions make communication in a common frequency band, they get jammed or they interfere with one another, resulting in deterioration in communication quality.

SUMMARY OF THE INVENTION

One or more embodiments of the present invention provide a wireless communication assistant tool and a method of making wireless communication, both of which are able to ensure improved communication environment.

The wireless communication assistant tool in accordance with one or more embodiments of the present invention includes an electric wire disposed at one end thereof relative to an antenna of a first wireless communication device in a contactless condition, and at the other end thereof relative to an antenna of a second wireless communication device in a contactless condition, the electric wire being comprised of a coaxial cable including a core line and a mesh line making a pair with the core line, radio signal being transmitted between one of ends of the core line and the antenna of the first wireless communication device, and further, the radio signal being transmitted between the other end of the core line and the antenna of the second wireless communication device.

A method of making wireless communication, in accordance with one or more embodiments of the present invention, includes setting an electrical wire at one end thereof relative to an antenna of a first wireless communication device in a contactless condition, the electric wire being comprised of a coaxial cable including a core line and a mesh line making a pair with the core line, setting the electrical wire at the other end thereof relative to an antenna of a second wireless communication device in a contactless condition, and making communication between the first and second wireless communication devices through the electric wire where radio signal is transmitted between one of ends of the core line and the antenna of the first wireless communication device, and further, radio signal is transmitted between the other end of the core line and the antenna of the second wireless communication device.

In one or more embodiments of the present invention, the electric wire is disposed between the antenna of the first wireless communication device and the antenna of the second wireless communication device such that the opposite ends of the electric wire are in a contactless condition with the antennas, and the first and second wireless communication devices make communication through the electric wire. Thus, since wireless communication can be made through the electric wire between the first and second wireless communication devices, they can make communication with each other without being interfered with other radio signals. Furthermore, since the electric wire is comprised of a coaxial cable, the mesh line is able to function as a protection shield to the core line acting as a transmission path.

Herein, a contactless condition to an antenna means that one of ends or the other end of the electric wire does not make direct contact with an antenna. Accordingly, if only one of ends or the other end of the electric wire does not make direct contact with an antenna, a contactless condition to an antenna is established, even if one of ends or the other end of the electric wire makes contact with a housing, a basic plate or any other parts of the first and second wireless communication devices.

The radio signal may be transmitted through the electric wire is comprised of WiFi or BLUETOOTH, in which case, it is possible in the signal transmission through the coaxial cable to reduce attenuation of signals in a high frequency band such as UHF band and SHF band through which WiFi or BLUETOOTH signals are transmitted.

It is preferable that the first wireless communication device is comprised of a camera operated through the radio signal transmitted through the electric wire from the second wireless communication device.

In the case that the first wireless communication device is comprised of a camera, it is possible to operate the camera through the second wireless communication device.

It is preferable that the wireless communication assistant tool further includes a support tool in the form of a bar, the camera being set at a distal end of the support tool. Since the camera is set at a distal end of the bar-shaped support tool, an operator is able to take photographs from a location higher or lower than the operator, or broadly take photographs.

The wireless communication assistant tool may further include a plurality of retainers arranged at a predetermined space on the support tool for setting the electric wire along the support tool, in which case, since the electric wire can be arranged along the bar-shaped support tool by retaining the electric wire by virtue of the retainers, an operator is not interfered with the electric wire when the operator operates the bar-shaped support tool for taking photographs.

The wireless communication assistant tool may further include a housing in which the camera is to be housed, in which case, the housing protects the camera from dusts and/or from being damaged due to collision with others. The camera housed in the housing may be attached to a distal end of the rod.

The housing may be designed to include an electromagnetic shield, in which case, radio signals transmitted from other wireless communication devices are difficult to reach the camera, and further, it is possible to prevent unnecessary other radio signals from mixing to the wireless communication made between the camera and the second wireless communication device.

The housing may be designed to be comprised of a housing for underwater photographing to house the camera therein in a watertight condition, in which case, even when underwater photographing is taken, radio signals are transmitted from the second wireless communication device from the antenna into air, pass through the electric wire acting as a part of transmission path, and reach the camera through the one of ends of the electric wire set in a watertight condition and in a contactless condition in which the electric wire keeps no contact with the camera. Furthermore, radio signals transmitted from the camera reaches the second wireless communication device in the counter direction transmission. Thus, since water does not exist in a transmission path from the second wireless communication device to the camera, the radio signals are able to run without remarkable attenuation between the second wireless communication device and the camera.

The wireless communication assistant tool may be designed to further include a connector in which an electrical connector portion of the electric wire is housed such that the electric wire is connected at one end thereof to an outer surface of the housing in a watertight condition, in which case, it is possible to set the one end of the electric wire on an outer surface of the housing in a watertight condition. Since the one end of the electric wire is set on an outer surface of the housing in a watertight condition, the electric wire can be readily attached even to existing housings.

The electric wire may be designed to extend at one end thereof through the housing to project into an inner space of the housing, in which case, it is possible to transmit radio signals having been transmitted through the one end of the electric wire, into an inner space of the housing set in a watertight condition.

The electric wire may be designed to be buried at one end thereof in the housing, in which case, radio signals having been transmitted through the one end of the electric wire buried in the housing to be kept in a watertight condition can be transmitted into an inner space of the housing through the housing.

It is preferable that the wireless communication assistant tool further includes a second connector at the other end thereof to be fit into a first connector equipped in the second wireless communication device. By designing the wireless communication assistant tool to further include a second connector at the other end of the electric wire to be fit into a first connector equipped in the second wireless communication device, the electric wire can be connected at the other end thereof to the second wireless communication device, and thus, the electric wire can be kept stable relative to the second wireless communication device.

In accordance with one or more embodiments of the present invention, the wireless communication can be made between the first and second wireless communication devices through the electric wire, and accordingly, the communication can be accomplished without being interfered with other radio signals, ensuring improvement in wireless communication environment.

BRIEF DESCRIPTION OF THE DRAWINGS

FIG. 11 illustrates a tool to be used for underwater photographing, as an example of the wireless communication assistant tool in accordance with the sixth embodiment of the present invention.

FIG. 12 illustrates a retainer equipped with the tool illustrated in FIG. 11.

FIG. 13 illustrates a housing of a tool to be used for underwater photographing, as an example of the wireless communication assistant tool in accordance with the seventh embodiment of the present invention.

INDICATION BY REFERENCE NUMERALS

Figure 1:
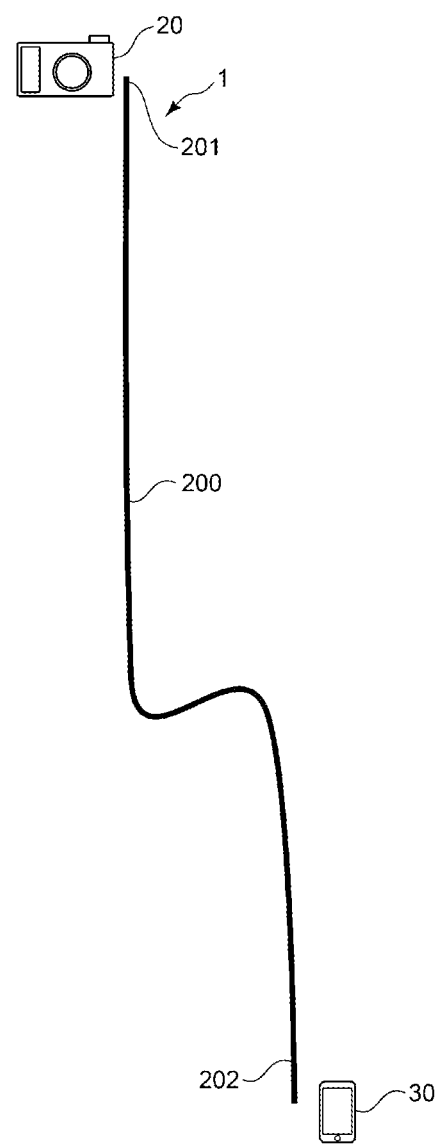
FIG. 1 illustrates the wireless communication assistant tool in accordance with the first embodiment of the present invention.

1 Wireless communication assistant tool
100, 101 Tool used for underwater photographing
200 Electric wire
201 One end
202 The other end
210 Electrical conductor portion
211 Core line
212 Mesh line
220 Cover
221 Internal electrical insulator
222 External skin electrical insulator
300 Connector portion
310 First portion
311 First space
312 Side surface
320 Second portion
321 Second space
322 Male thread
330 Fixing part
331 First nut
332 Second nut
333 Packing
340 Tube
400 Rod
410 Rod body
420 Set plate
430, 431, 432 Retainers
431a Through-hole
432a Claw
432b Space
500 Ear phone plug
10 Housing
11 Window for photographing
12 Antimagnetic layer
13 Portion directed to a camera
20 Camera
30 Smartphone
31 Operation screen
32 Shortcut icon
33 Finder
34 Shutter button

EMBODIMENTS FOR REDUCING THE INVENTION TO PRACTICE

First Embodiment

The wireless communication assistant tool in accordance with the first embodiment of the present invention is explained hereinbelow with reference to the drawings.

A wireless communication assistant tool 1 illustrated in FIG. 1 includes an electric wire 200 comprised of a coaxial cable. The electric wire 200 is situated at one end 201 in the vicinity of a camera 20 (a first wireless communication device), and further, at the other end 202 in the vicinity of a smartphone 30 (a second wireless communication device).

The opposite ends (the one end 201 and the other end 202) of the electric wire 200 are disposed just in the vicinity of the camera 20 and the smartphone 30, respectively, but are disposed in a contactless condition relative to an antenna (not illustrated) of the camera 20 and an antenna (not illustrated) of the smartphone 30, respectively.

The camera 20 is functioned to be operated through radio signals, and is comprised of a digital camera capable of taking still pictures and motion pictures. As radio signals, WiFi, BLUETOOTH or any other radio communication systems may be chosen.

The smartphone 30 includes an application software installed therein for carrying out wireless control to the camera 20. The smartphone 30 includes therein an antenna (not illustrated) through which radio signals are transmitted to the camera 20 for remote controlling the camera 20.

How to use the wireless communication assistant tool 1 in accordance with the first embodiment of the present invention, having the structure as mentioned above, is explained hereinbelow with reference to the drawings.

Figure 2:
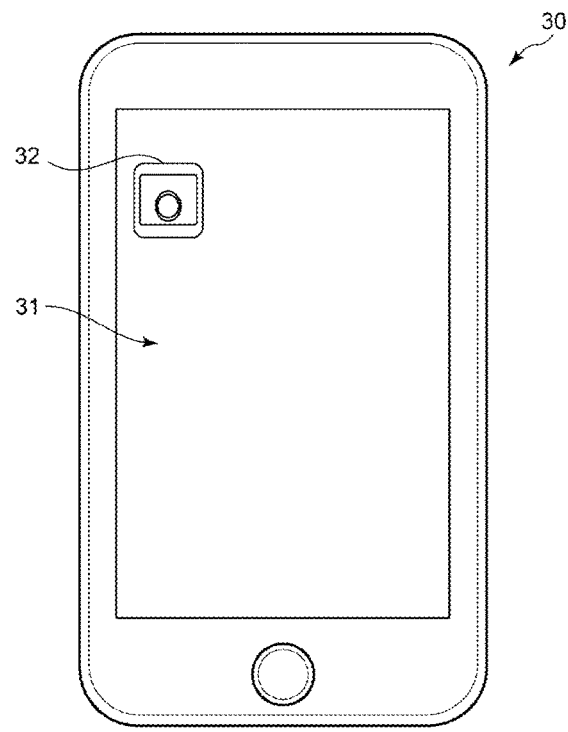
FIG. 2 illustrates a screen of a smartphone illustrated in FIG. 1 before an application software is caused to start up.

A photographer starts up the application software acting as a program to allow the smartphone 30 to function as a controller for operating the camera 20 through radio signals. As illustrated in FIG. 2, the application software is caused to start up by tapping a shortcut icon 32 displayed in a screen 31.

Figure 3:
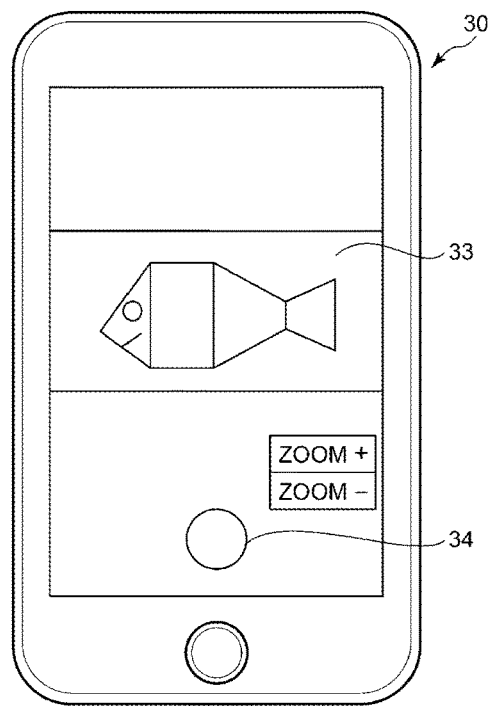
FIG. 3 illustrates the screen of the smartphone illustrated in FIG. 2 after the application software started up.

The application software having been caused to start up by tapping the shortcut icon 32 allows pictures transmitted from the camera 20 to be displayed as a finder 33 in the screen 31 (see FIG. 3). Viewing the finder 33, the photographer taps a shutter button 34 displayed in the screen 31 when his/her favorite scene is displayed in the finder 33, to thereby instruct the camera 20 to take a photograph of the scene.

The above-mentioned communication between the smartphone 30 and the camera 20 is made through the wireless communication assistant tool 1 comprised of an electric wire 200.

Radio signals are transmitted from the smartphone 30 into air through an internal antenna of the smartphone 30, pass through a core line 211 (see FIG. 6) acting as a part of a transmission path, from the other end 202 to the one end 201 of the electric wire 200, and arrive at an internal antenna of the camera through air. Radio signals transmitted from the camera 20 arrive at the smartphone 30 in a counter direction course.

As mentioned above, the electric wire 200 is disposed between an antenna of the camera 20 and an antenna of the smartphone 30 such that the opposite ends (the one end 201 and the other end 202) of the electric wire 200 are in a contactless condition relative to the camera 20 and the smartphone 30, and the camera 20 and the smartphone 30 make communication with each other through the electric wire 200. Thus, since the wireless communication between the camera 20 and the smartphone 30 can be made through the electric wire 200 acting as a transmission path, the camera 20 and the smartphone 30 can make communication with each other without being interfered with other radio signals. Consequently, the wireless communication assistant tool 1 ensures improved communication environment.

Furthermore, it is not necessary to remodel the existing camera 20 and/or smartphone 30, if only the electric wire 200 is disposed in the vicinity of both the camera 20 and the smartphone 30.

Furthermore, since the electric wire 200 is comprised of a coaxial cable, as illustrated in FIG. 1, a mesh line acts as a shield for protecting a core line acting as a transmission path, from external noises. Accordingly, it is possible to prevent other radio signals from mixing into radio signals to be transmitted through the coaxial cable. As radio signals, there may be used very short waves (VHF: Very High Frequency) having a frequency in the range of 30 MHz to 300 MHz, ultrashort waves (UHF: Ultra High Frequency)

having a frequency in the range of 300 MHz to 3 GHz, micro waves (SHF: Super High Frequency) having a frequency in the range of 3 GHz to 30 GHz, or millimetric waves (EHF: Extra High Frequency) having a frequency in the range of 30 GHz to 300 GHz.

In particular, it is possible to reduce attenuation of radio signals in a high frequency band in the case that the radio signals are transmitted through a coaxial cable in UHF and SHF bands in which WiFi and BLUETOOTH are transmitted. Thus, it is also possible to remarkably increase a communication distance in accordance with a length of a coaxial cable. Accordingly, communication environment can be further improved, resulting in that the electric wire 200 can ensure high quality in communication.

Wireless communication is established by virtue of radio signals between the one end 201 of the electric wire 200 and the camera 200, and further between the other end 202 of the electric wire 200 and the smartphone 30. In general, the camera 20 and the smartphone 30 employ radio signals such as WiFi and BLUETOOTH for transmitting and/or receiving data.

Accordingly, it is not necessary for the electric wire 200 in the wireless communication through radio signals to have a coil at the opposite ends (the one end 201 and the other end 202) for efficiently generating a magnetic field or an electric field, differently from both the electromagnetic induction system in which data or electric power is transmitted by virtue of fluctuation in a magnetic field, and the magnetic resonance system caused by magnetic field coupling and electric field coupling. Furthermore, since various devices make wireless communication, the wireless communication assistant tool 1 can be broadly applied to data transmission fields.

Second Embodiment

A tool to be used for underwater photographing, as an example of the wireless communication assistant tool in accordance with the second embodiment of the present invention, is explained hereinbelow with reference to the drawings. Parts or elements illustrated in FIGS. 4 to 7 which correspond to those illustrated in FIG. 1 have been provided with the same reference numerals, and will not be explained.

The tool is used for remote controlling the camera from a land.

It was conventionally necessary to remote control a camera from a land or above water for taking photographs in water unless a photographer goes under water together with a camera. The patent document 2 discloses a remote-controlled camera submerged into water. Furthermore, the patent document 3 discloses a camera system for taking photographs in water.

The patent document 2 discloses a hanging type wireless television camera that includes a watertight container having a lower surface formed as a transparent window, a downwardly directed television camera, a power source to supply electric power to the television camera, and a circuit for transmitting radio signals indicative of pictures taken by the television camera. The television camera, the power source, and the circuit are contained in the container. A flat feeder line acting as an antenna through which radio signals are transmitted is electrically connected to the circuit, and further, the container is hung by means of the feeder line by a predetermined length.

The patent document 3 discloses the camera system and the waterproof housing. The switch detecting section transmits a signal indicative of a status of an operation switch to a radio signal transmitter in dependence on how the operation switch of the waterproof housing is operated. The radio signal transmitter the received radio signal to a radio signal communication adapter through an antenna, and then, the radio signal communication adapter transmits the received signal to a camera through a connector. The control section stored in the camera carries out a control in accordance with the signal having been received through the connector.

However, since the feeder line electrically connected to the circuit which transmits radio signals is connected to the antenna in the hanging type radio signal television camera disclosed in the patent document 2, it is necessary, in order to apply the patent document 2 to existing cameras, to form existing cameras with a through-hole through which an electric wire is connected, and thus, it is difficult to apply the patent document 2 to existing cameras. Furthermore, if a feeder line is connected directly to an antenna, it is afraid that a trouble may occur due to a relation between a length of the feeder line and a frequency of the radio signals.

Furthermore, since wireless communication is made in the waterproof housing in the camera system and the waterproof housing disclosed in the patent document 3, it is not possible to carry out remote control.

Thus, there is a need to a tool used for underwater photographing, capable of remote-controlling a camera from a land or from outside of water without much changing a structure of a camera capable of being controlled through radio signals and being submerged in water where radio signals are difficult to run.

Figure 4:
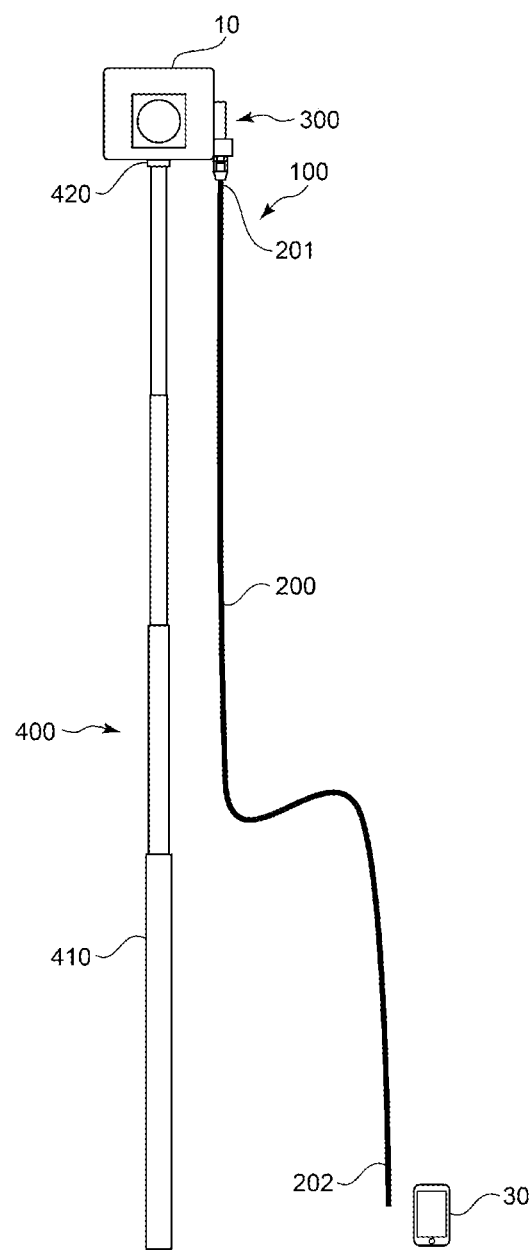
FIG. 4 illustrates a tool to be used for underwater photographing, as an example of the wireless communication assistant tool in accordance with the second embodiment of the present invention.
Figure 5:
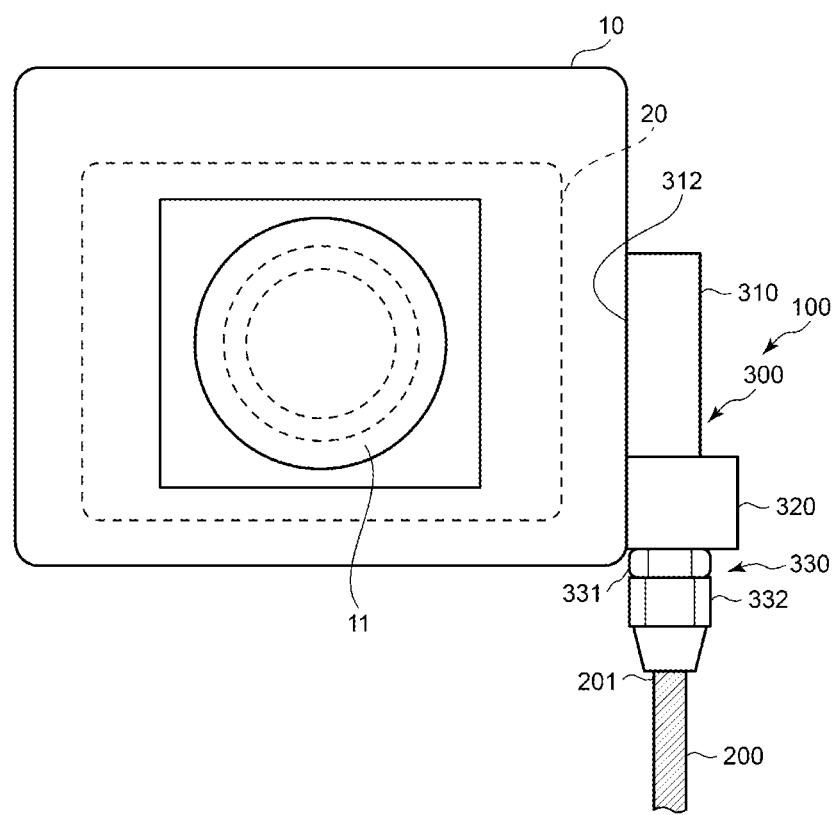
FIG. 5 is an enlarged view of the tool and the housing both illustrated in FIG. 4.

As illustrated in FIGS. 4 and 5, a tool 100 to be used for underwater photographing is used for remote-controlling a camera 20 from a land or from above water through a smartphone 30 acting as a controller. The camera 20 is housed in a housing 10 used for underwater photographing.

The tool 100 used for underwater photographing includes an electric wire 200 disposed between the housing 10 and the camera 20, a connector portion 300 for connecting the one end 201 of the electric wire 200 to the housing 10, and a rod 400 acting as a support tool in the form of a bar.

Figure 6:
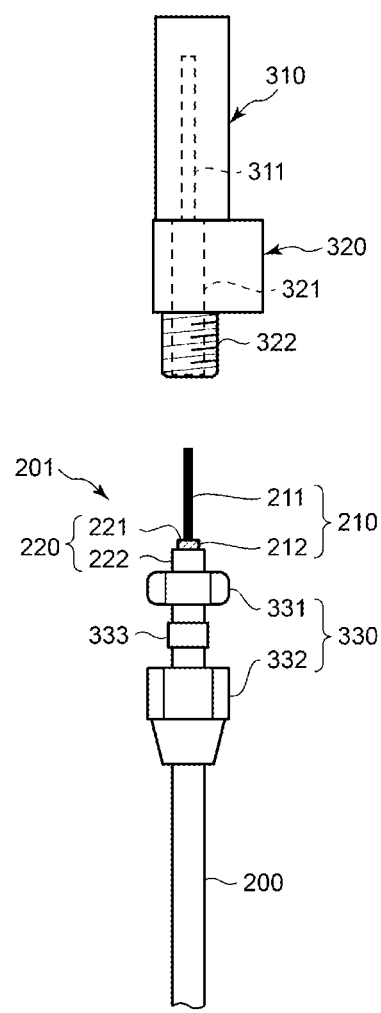
FIG. 6 is an exploded view of a connector portion of the tool illustrated in FIG. 5, and a one end of the electric wire.

The electric wire 200 is comprised of a coaxial cable. As illustrated in FIG. 6, the electric wire 200 includes an electrical conductor portion 210 and a cover portion 220. The electrical conductor portion 210 includes a core line 211, and a mesh line 212 making a pair with the core line 211. The cover portion 220 includes an internal electrical insulator 221 covering the core line 211 therewith, and an external skin electrical insulator 222 covering the mesh line 212 therewith.

As illustrated in FIGS. 5 and 6, the connector portion 300 connects the one end 201 of the electric wire 200 to the housing 10 in a watertight condition and in such a condition that the electric wire 200 makes no contact with the camera 20. The connector portion 300 is made from resin. The connector portion 300 includes a first portion 310, a second portion 320, and a fixing part 330.

The first portion 310 is fixed tightly to a side of the housing 10. The first portion 310 is designed to be elongate rectangular parallelepiped. The first portion 310 is formed an elongate first space 311 into which the core line 211 exposed out of the cover portion 220 is to be inserted. The housing 10, the first portion 310 and the second portion 320 may be formed integral with one another, in which case, the tool 100 may be commercially sold as the housing 10 companied with the tool 100.

In the case that the housing 10 is an existing housing, for instance, a commercially available housing, the first portion 310 may be welded to the housing 10, adhered to the housing 10 by means of an adhesive or a double-sided adhesive tape, or screwed to the housing 10.

As an alternative, the housing 10 may be formed with a slot, and the first portion 310 of the connector portion 300 may be formed with a plate-shaped projection. The connector portion may be fixed to the housing by sliding the plate-shaped projection into the slot.

The second portion 320 is formed with a second space 321 in which the internal electrical insulator 221 having a greater diameter than the same of the core line 211, the mesh line 212 and the external skin electrical insulator 222 are to be inserted. The second portion 320 further includes a male threaded portion 322 into which the fixing part 330 is to be threaded.

The fixing part 330 fixes the electric wire 200 to the second portion 320 in a watertight condition. The fixing part 330 includes a first nut 331 and a second nut 332 into which the electric wire 200 is inserted and which are screwed with the male threaded portion 322, and a packing 333 which is wound around the electric wire 200 or into which the electric wire 200 is inserted. The packing 333 blocks a gap formed between an inner surface of the second nut 332 and an outer surface of the electric wire 200, to thereby ensure watertight condition.

Figure 7:
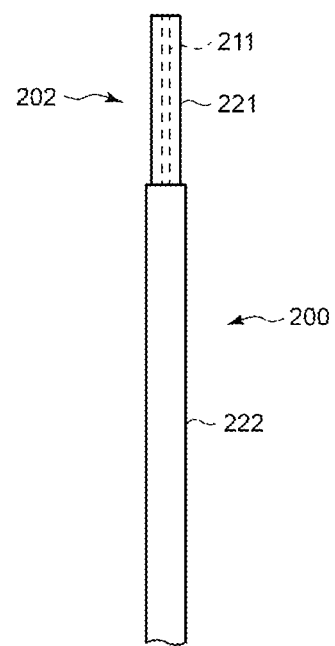
FIG. 7 is an enlarged view of the other end of the electric wire illustrated in FIG. 4.

As illustrated in FIGS. 4 and 7, the other end 202, which is the end opposite to the one end 201 of the electric wire 200, is disposed in a contactless condition relative to the smartphone 30. At the other end 202 of the electric wire 200, the internal electrical insulator 221 covering the core line 211 therewith is exposed out of the external skin electrical insulator 222 and the mesh line 212. Thus, the core line 211 can be kept covered with the internal electrical insulator 221, and the mesh line 212 can be kept covered with the external skin electrical insulator 222.

If only the other end 202 of the electric wire 200 is disposed in the vicinity of the smartphone 30, the external skin electrical insulator 222 may be kept covering the mesh line 212 after the coaxial cable is cut into a predetermined length, or the core line 211 may be exposed out of the internal electrical insulator 221. However, it is preferable that the core line 211 is covered with the internal electrical insulator 221 in order to protect the core line 211.

As illustrated in FIG. 4, the rod 400 includes a gradually extendable and contractable rod body 410, and a set plate 420 to which the housing 10 can be fixed or the camera 20 can be directly attached.

Hereinbelow is explained the housing 10.

As illustrated in FIG. 5, the housing 10 is designed to be watertight to allow the camera 20 to be safely used under water. The housing 10 is made of transparent resin to allow a photographer standing outside of the housing 10 can see the camera 20 housed in the housing 10. The housing 10 has an inner space matching to a shape of the camera 20 to allow the camera 20 to fit in the housing 10.

How the tool 100 for underwater photographing in accordance with the second embodiment of the present invention, having the structure as mentioned above, is used is explained hereinbelow with reference to the drawings.

As illustrated in FIG. 4, a photographer attaches the housing 10 in which the camera 20 is housed onto the set plate 420 of the rod 400, and then, adjusts a length of the rod body 410 to a desired length. Then, he/she holds the rod 400 at a proximal end thereof to put the camera 20 attached to the rod 400 at a distal end thereof into the water.

Then, the photographer operates the camera 20 through the smartphone 30 to take pictures in such a manner as mentioned in the first embodiment with reference to FIGS. 2 and 3.

Radio signals are transmitted through a transmission path defined by the electric wire 200 without existence of water in a transmission path to the camera 20 from the smartphone 30. Accordingly, the radio signals can be transmitted between the smartphone 30 and the camera 20 without significant attenuation.

The connector portion 300 makes contact with an outer surface of the housing 10. Accordingly, the connector portion 300 can be readily attached to existing housings by adhering or welding the connector portion 300 to an outer surface of the existing housings.

In addition, since the connector portion 300 houses in a watertight condition the core line 211 exposed out of the cover portion 200 of the electric wire 200, it is possible to position the electric wire 200 in the vicinity of the housing 10 without existence of water between the housing 10 and the electric wire 200.

Consequently, by disposing the tool 100 between the camera 20 and the smartphone 30, it is possible to carry out underwater photographing through the use of the camera 20 housed in the housing 10 without significantly changing a structure of the camera 20 capable of being remote controlled, but being not suitable to underwater photographing.

Furthermore, as illustrated in FIG. 6, since the electric wire 200 is comprised of a coaxial cable, the mesh line 212 acts as a shield for protecting the core line 211 defining a transmission path, from external noises, resulting in that the electric wire 200 ensures highly qualified communication.

As illustrated in FIG. 4, the housing 10 is attached to a distal end of the rod 400 in the second embodiment. As an alternative, the housing 10 in which the camera 20 is housed may be hung through the electric wire 200 without using the rod 400, if the connector portion 300 is fixed to the housing 10 with sufficient strength, and further, the electric wire 200 has a sufficient strength.

The rod 400 is designed to be extendable and contractable in the second embodiment. As an alternative, the bar-shaped support tool may be designed to be comprised of a plurality of separate parts or to be not extendable and contractable, if the support tool has the set plate 420 to which the housing 10 can be attached.

Third Embodiment

A tool used for underwater photographing, in accordance with the third embodiment of the present invention, is explained hereinbelow with reference to the drawings.

Figure 8:
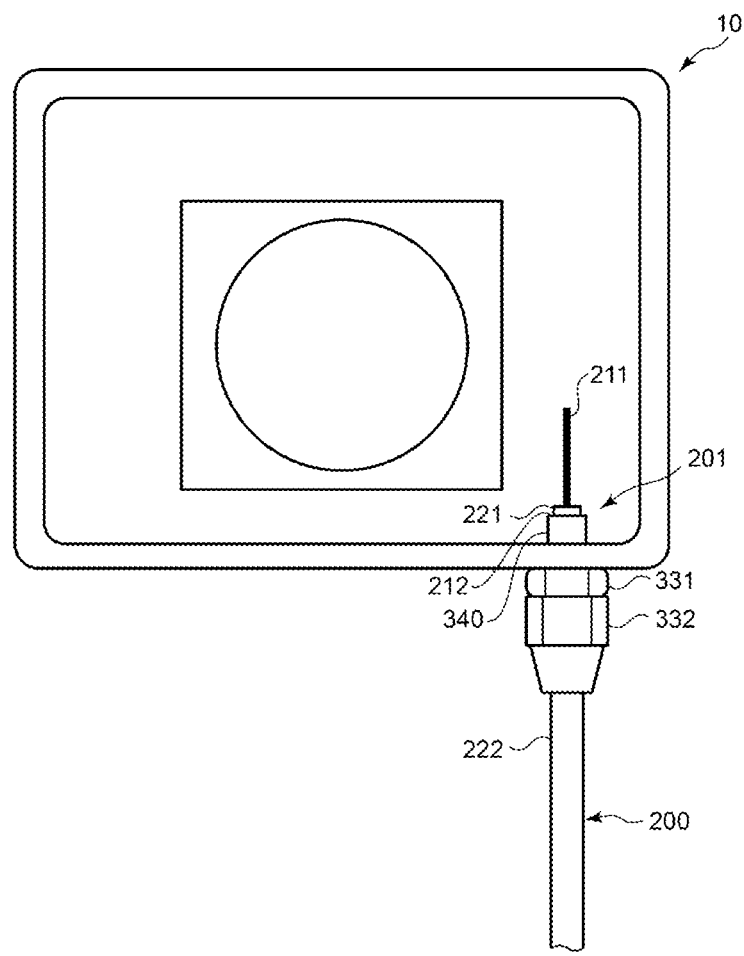
FIG. 8 illustrates a tool to be used for underwater photographing, as an example of the wireless communication assistant tool in accordance with the third embodiment of the present invention.

As illustrated in FIG. 8, in the tool used for underwater photographing, in accordance with the third embodiment, the one end 201 of the electric wire 200 passes through the housing 10 and projects into an inner space of the housing 10. The other end 202 (not illustrated) of the electric wire 200 is disposed in a contactless condition relative to the smartphone 30, similarly to FIGS. 1 and 4.

The external skin electrical insulator 222 and the mesh line 212 are partially removed at the one end 201 of the electric wire 200, and further, the core line 211 is exposed out of the internal electrical insulator 221.

A tube 340 into which the electric wire 200 is inserted passes through the housing 10, and the one end 201 projects out of the tube 340. The one end 201 of the electric wire 200 is fastened by means of a first nut 331 and a second nut 332 with the tube 340 being sandwiched therebetween, and accordingly, the one end 201 of the electric wire 200 is fixed to the housing 10.

Since the one end 201 of the electric wire 200 passes through the housing 10 and projects into an inner space of the housing 10, radio signals can be transmitted through the one end 201 of the electric wire 200 into an inner space of the housing 10 kept in a watertight condition.

Fourth Embodiment

A tool used for underwater photographing, in accordance with the fourth embodiment of the present invention, is explained hereinbelow with reference to the drawings.

Figure 9:
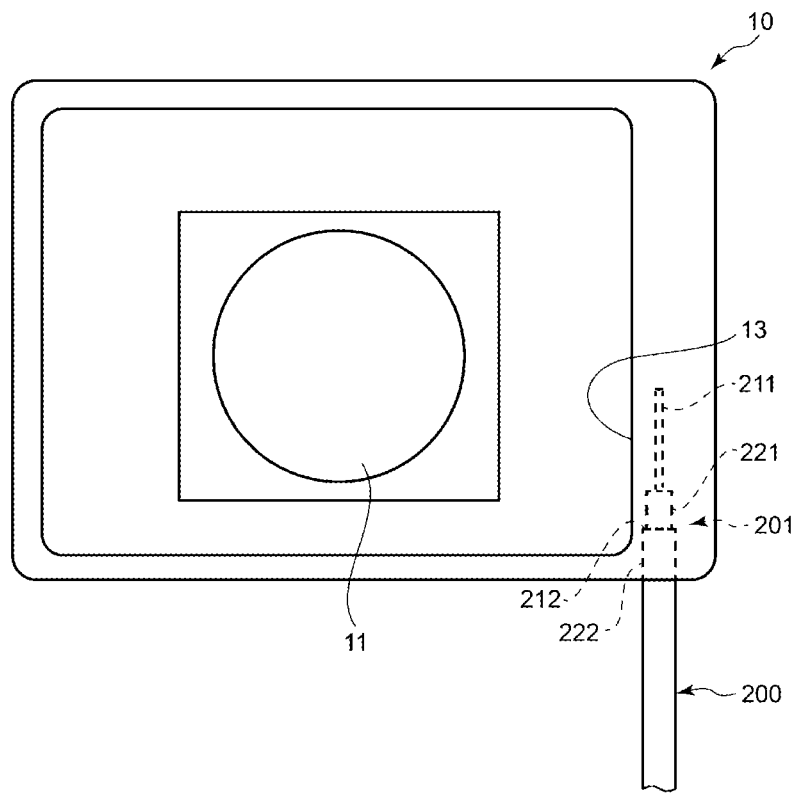
FIG. 9 illustrates a tool to be used for underwater photographing, as an example of the wireless communication assistant tool in accordance with the fourth embodiment of the present invention.

As illustrated in FIG. 9, the one end 201 of the electric wire 200 is buried in the housing 10 in the tool in accordance with the fourth embodiment. The other end 202 (not illustrated) of the electric wire 200 is disposed in a contactless condition relative to the camera 20, similarly to FIGS. 1 and 4.

The external skin electrical insulator 222 and the mesh line 212 are partially removed at the one end 201 of the electric wire 200, and further, the core line 211 is exposed out of the internal electrical insulator 221.

In order for the one end 201 of the electric wire 200 to be buried in the housing 10, the one end 201 of the electric wire 200 is situated in a cavity of a mold when the housing 10 is fabricated by means of the mold. Thus, when the housing 10 is completed, the one end 201 of the electric wire 200 is buried in and formed integral with the housing 10 without gaps.

As mentioned above, the one end 201 of the electric wire 200 can be kept in a watertight condition and kept in a contactless condition relative to the camera 20 by designing the one end 201 of the electric wire 200 to be buried in the housing 10, ensuring that radio signals transmitted through the one end 201 of the electric wire 200 can be radiated into an inner space of the housing 10.

Fifth Embodiment

A tool used for underwater photographing, in accordance with the fifth embodiment of the present invention, is explained hereinbelow with reference to the drawings.

Figure 10:
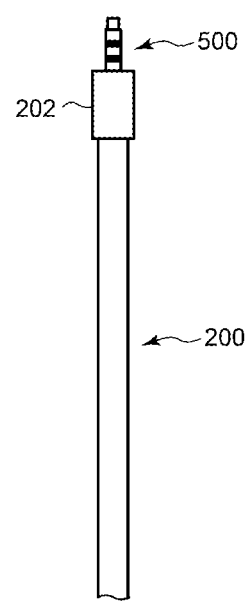
FIG. 10 illustrates the other end of the electric wire to be used for underwater photographing, as an example of the wireless communication assistant tool in accordance with the fifth embodiment of the present invention.

In the fifth embodiment, as illustrated in FIG. 10, an ear phone plug 500 (a second connector) is formed at the other end 202 of the electric wire 200 disposed in the vicinity of the smartphone 30 (see FIG. 1). The ear phone plug 500 is designed to be fit into an ear phone jack (a first connector) of the smartphone 30.

The ear phone plug 500 is kept in electrical connection with the electrical conductor portion 210 (the core line 211) defining a transmission path of the electric wire 200. Accordingly, fitting the ear phone plug 500 into an ear phone jack of the smartphone 30, the electrical conductor portion 210 is electrically connected with a circuit for outputting a voice of the smartphone 30. While the camera 20 is operated by means of the smartphone 30, the smartphone 30 does not output a voice, and hence, transmission of radio signals through the electric wire 200 slightly consumes electric power. Thus, even if the ear phone plug 500 and the electrical conductor portion 210 are in electrical connection with each other, a circuit for outputting a voice is not harmfully influenced.

Radio signals transmitted through the electrical conductor portion 210 are received to a signal line of the voice-outputting circuit electrically connected to an ear phone jack of the smartphone 30. Thus, since radio signals transmitted through the electrical conductor portion 210 can be led to a position closer to an antenna of the smartphone 30, further improvement in quality of communication can be ensured.

Furthermore, it is possible to fix the other end 202 of the electric wire 200 to the smartphone 30 by fitting the ear phone plug 500 into the ear phone jack, ensuring that the other end 202 of the electric wire 200 can be kept stable relative to the smartphone 30. In addition, it is possible to keep the other end 202 of the electric wire 200 in the vicinity of the smartphone 30.

Sixth Embodiment

A tool used for underwater photographing, in accordance with the sixth embodiment of the present invention, is explained hereinbelow with reference to the drawings.

As illustrated in FIG. 11, in a tool 101 used for underwater photographing, in accordance with the sixth embodiment, the rod body 410 of the rod 400 includes a plurality of retainers 430 at a predetermined space for arranging the electric wire 200 onto the rod body 410.

Figure 12A:
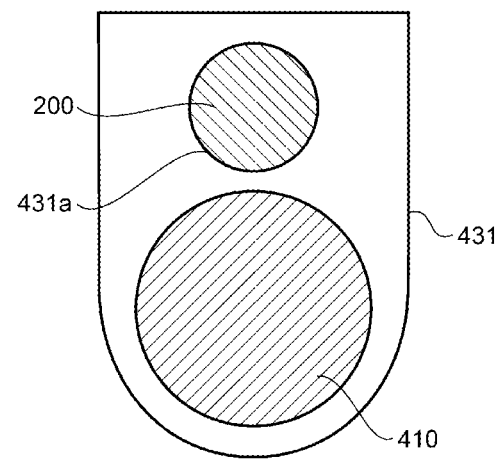
FIG. 12(A) illustrates a retainer formed with a through-hole through which the electric wire is inserted.
Figure 12B:
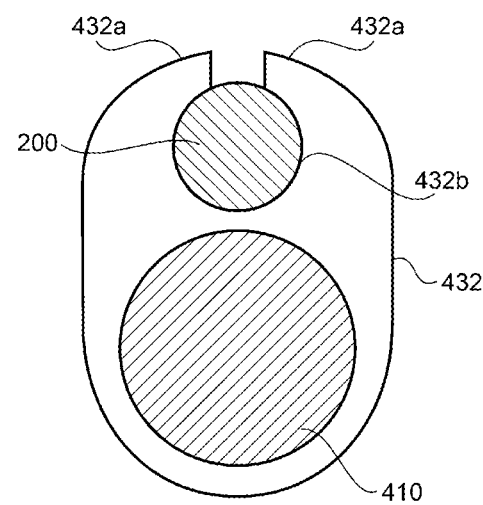
FIG. 12(B) illustrates a retainer formed with a pair of claws to sandwich the electric wire therebetween.

Each of the retainers 430 may be designed to have any shape, if it is able to retain the electric wire 200. For instance, as illustrated in FIG. 12(A), each of retainers 431 is formed with a through-hole 431a through which the electric wire 200 is inserted. As an alternative, as illustrated in FIG. 12(B), each of retainers 432 may be formed with a pair of claws 432a. The electric wire 200 is inserted into a circular space 432b formed between the claws 432a to thereby be sandwiched by the claws 432a acting as clips.

Thus, the electric wire 200 can be arranged along the rod body 410 by forming the retainers 430 (431, 432) on the rod 400 at a predetermined space. Consequently, when a photographer operates the rod 400, he/she is not interfered with the electric wire 200.

Seventh Embodiment

A tool used for underwater photographing, in accordance with the seventh embodiment of the present invention, is explained hereinbelow with reference to the drawings. Parts or elements illustrated in FIG. 13 which correspond to those illustrated in FIG. 8 have been provided with the same reference numerals, and will not be explained.

The tool in accordance with the seventh embodiment additionally includes an electromagnetic shield relative to the housing of the tool in accordance with the third embodiment, illustrated in FIG. 8, and thus, is able to make wireless communication also on a land.

An electromagnetic shield for the housing 10 is comprised of an antimagnetic layer 12 formed on inner surfaces of the housing 10 except a window 11 aligning with a lens of the camera 20 housed in the housing 10.

The antimagnetic layer 12 can be formed by spraying silver-coated copper powder. The silver-coated copper powder is commercially available as an electromagnetic shield. Furthermore, a transparent electromagnetic shield film may coat the window 11. An electromagnetic shield film may coat not only the window 11, but also inner surfaces of the housing 10 other than the window 11 to define the antimagnetic layer 12.

The antimagnetic layer 12 surrounding the camera 20 blocks radio signals. The core line 211 of the electric wire 200 is exposed in the inner space surrounded by the antimagnetic layer 12. Thus, radio signals other than radio signals transmitted to the camera through the electric wire 200 are all blocked by the antimagnetic layer 12 formed in the housing 10. Consequently, even if the tool is used in the air, it is possible to make wireless communication between the camera and the smartphone without being interfered with other radio signals. Thus, the housing 10 including the antimagnetic layer 12 is able to ensure further improved communication environment in water and further in air.

In the seventh embodiment, the antimagnetic layer 12 acting as an electromagnetic shield is formed on inner surfaces of the housing 10. The electromagnetic shield is to be formed in an area other than the window 11. Accordingly, the antimagnetic layer 12 may be formed on outer surfaces of the housing 10, or inside of the housing 10.

Furthermore, a metal mesh may be used instead of the antimagnetic layer 12. As an alternative, the housing 10 can act as an electromagnetic shield by designing the housing 10 to be comprised of a metal box.

In the case that an electromagnetic shield is applied to the housing 10 illustrated in FIG. 5, an electromagnetic shield is formed in an area other than a side 312 of the connector portion 300 through which the connector portion 300 makes contact with the housing 10, and the window 11 such that the electromagnetic shield surrounds both the camera 20 and the core line 211 of the electric wire 200.

In the case that an electromagnetic shield is applied to the housing 10 illustrated in FIG. 9, an electromagnetic shield is formed in an area other than a portion 13 disposed between the camera 20 and the core line 211 of the electric wire 200, and the window 11 such that the electromagnetic shield surrounds both the camera 20 and the core line 211 of the electric wire 200.

By designing an electromagnetic shield in the above-mentioned manner, wireless communication between the camera 20 and the smartphone 30 can be made without being interfered with other radio signals.

The first to seventh embodiments of the present invention have been explained hereinabove, but it should be noted that the scope of the present invention is not to be limited to the first to seventh embodiments.

In the first embodiment, as illustrated in FIG. 1, the first wireless communication device is comprised of the camera 20, and the second wireless communication device is comprised of the smartphone 30. As an alternative, the first wireless communication device may be comprised of other wireless communication devices such as a printer and a video camera, and the second wireless communication device may be comprised of a tablet type computer, a notebook type computer, or a desktop type computer. In addition, since the wireless communication assistant tool can provide improved communication environment even if the first and second wireless communication devices are situated far away from each other, the wireless communication assistant tool may be disposed at a construction site, and used only for construction-relating jobs.

The housing 10 in the second to seventh embodiments are designed to be watertight. In the case that the housing 10 is used only on a land or in air, it is not necessary to design the housing 10 to be watertight. Since the camera 20 is housed in the housing 10, the housing 10 protects the camera 20 from dusts or being damaged by collision with others. The camera 20 housed in the housing 10 may be attached to a distal end of the rod 400.

In the case that the wireless communication assistant tool in accordance with the present invention is used only on a land or in air, the camera 20 may be attached directly to the rod 400 without using the housing 10.

In the second to seventh embodiments, the communication between the smartphone 30 and the camera 20 is made through radio signals. In the case that the camera 20 is attached to a platform formed in the housing, a motor may be mounted on the platform so as to control an elevation angle of the camera 20, in which case, the electric wire 200 in the tool 100 can define a transmission path through which radio signals for driving the motor are transmitted.

If the motor can be wirelessly operated, an elevation angle of the platform can be varied by radio signals transmitted through the electric wire from an operation device, similarly to the camera 20. As an alternative, if the motor cannot be wirelessly operated, it is preferable to use a single electric wire comprised of an electric wire through which radio signals for operating the camera 20 are transmitted, and an electric wire through which wired signals for driving the motor are transmitted.

In the fifth embodiment, the ear phone plug 500 as a second connector is attached to the other end 202 of the electric wire 200, wherein an ear phone jack of the smartphone 30 is assumed as a first connector. Any connector may be used as the first connector, if equipped in the smartphone 30. For instance, the first connector may be comprised of a USB connector. In the case that an operation device is comprised of a portable terminal device such as a tablet type terminal device and a notebook type personal computer, there may be used an electric power plug, a connector for connecting to a monitor, or a LAN connector. That is, any connector may be used as the second connector, if a first connector of an operation device can be employed, and further, the second connector can be fit into the first connector.

Furthermore, the electric wire 200 may be comprised of any wire such as a single wire, a twisted wire, or a parallel wire instead of a coaxial cable.

The tool used for underwater photographing makes it possible to use a camera, which is wirelessly operated and cannot be used in water, in water. Thus, the tool may be used for taking photographs of fish or sea bed as private hobby, and further, for carrying out commercial survey and/or investigation by companies.

INDUSTRIAL APPLICABILITY

The wireless communication assistant tool in accordance with the present invention can be applied any cases where first and second wireless communication devices located far away from each other make communication. In particular, the wireless communication assistant tool is suitable to environment where a lot of wireless communication devices make wireless communication in common frequency bands.

The invention claimed is:

1. A wireless communication assistant tool including an electric wire disposed at one end thereof relative to an antenna of a first wireless communication device in a contactless condition, and at the other end thereof relative to an antenna of a second wireless communication device in a contactless condition, the electric wire being comprised of a coaxial cable including a core line and a mesh line making a pair with the core line, radio signal being transmitted between one of ends of the core line and the antenna of the first wireless communication device, and further, the radio signal being transmitted between the other end of the core line and the antenna of the second wireless communication device.

2. The wireless communication assistant tool as set forth in claim 1, wherein the radio signal being transmitted through the electric wire is comprised of WiFi or BLUETOOTH.

3. The wireless communication assistant tool as set forth in claim 2, wherein the first wireless communication device is comprised of a camera operated through the radio signal transmitted through the electric wire from the second wireless communication device.

4. The wireless communication assistant tool as set forth in claim 1, wherein the first wireless communication device is comprised of a camera operated through the radio signal transmitted through the electric wire from the second wireless communication device.

5. The wireless communication assistant tool as set forth in claim 4, further including a support tool in the form of a bar, the camera being set at a distal end of the support tool.

6. The wireless communication assistant tool as set forth in claim 5, further including a plurality of retainers arranged at a predetermined space on the support tool for setting the electric wire along the support tool.

7. The wireless communication assistant tool as set forth in claim 4, further including a housing in which the camera is to be housed.

8. The wireless communication assistant tool as set forth in claim 7, wherein the housing includes an electromagnetic shield.

9. The wireless communication assistant tool as set forth in claim 8, wherein the housing is comprised of a housing for underwater photographing to house the camera therein in a watertight condition.

10. The wireless communication assistant tool as set forth in claim 7, wherein the housing is comprised of a housing for underwater photographing to house the camera therein in a watertight condition.

11. The wireless communication assistant tool as set forth in claim 10, further including a connector in which an electrical connector portion of the electric wire is housed such that the electric wire is connected at one end thereof to an outer surface of the housing in a watertight condition.

12. The wireless communication assistant tool as set forth in claim 10, wherein the electric wire extends at one end thereof through the housing to project into an inner space of the housing.

13. The wireless communication assistant tool as set forth in claim 10, wherein the electric wire is buried at one end thereof in the housing.

14. The wireless communication assistant tool as set forth in claim 1, further including a second connector at the other end of the electric wire to be fit into a first connector equipped in the second wireless communication device.

15. A method of making wireless communication, including:
setting an electrical wire at one end thereof relative to an antenna of a first wireless communication device in a contactless condition, the electric wire being comprised of a coaxial cable including a core line and a mesh line making a pair with the core line;
setting the electrical wire at the other end thereof relative to an antenna of a second wireless communication device in a contactless condition; and
making communication between the first and second wireless communication devices through the electric wire where radio signal is transmitted between one of ends of the core line and the antenna of the first wireless communication device, and further, the radio signal is transmitted between the other end of the core line and the antenna of the second wireless communication device.

* * * * *